(12) United States Patent
Kim

(10) Patent No.: US 9,041,677 B2
(45) Date of Patent: May 26, 2015

(54) MOBILE TERMINAL AND METHOD OF CONTROLLING THE SAME

(71) Applicant: LG ELECTRONICS INC., Seoul (KR)

(72) Inventor: Youngjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 14/062,620

(22) Filed: Oct. 24, 2013

(65) Prior Publication Data

US 2014/0152594 A1 Jun. 5, 2014

(30) Foreign Application Priority Data

Nov. 30, 2012 (KR) .......................... 10-2012-0138400

(51) Int. Cl.
*G06F 3/041* (2006.01)
*G06F 3/0488* (2013.01)

(52) U.S. Cl.
CPC .... *G06F 3/0416* (2013.01); *G06F 2203/04106* (2013.01); *G06F 2203/04807* (2013.01); *G06F 2203/04808* (2013.01); *G06F 3/04883* (2013.01)

(58) Field of Classification Search
CPC ....... G06F 3/041; G06F 3/0416; G06F 3/048; G06F 3/04817; G06F 3/0484; G06F 3/04883; G06F 2203/04104; G06F 2203/04106
See application file for complete search history.

(56) References Cited

U.S. PATENT DOCUMENTS

| | | | | |
|---|---|---|---|---|
| 8,212,788 B2* | 7/2012 | Lam | | 345/173 |
| 2006/0001650 A1* | 1/2006 | Robbins et al. | | 345/173 |
| 2010/0090971 A1* | 4/2010 | Choi et al. | | 345/173 |
| 2010/0295802 A1* | 11/2010 | Lee | | 345/173 |
| 2011/0029920 A1* | 2/2011 | Kang | | 715/810 |
| 2011/0187655 A1* | 8/2011 | Min et al. | | 345/173 |
| 2011/0209039 A1* | 8/2011 | Hinckley et al. | | 715/206 |
| 2011/0231796 A1* | 9/2011 | Vigil | | 715/810 |
| 2011/0300910 A1* | 12/2011 | Choi | | 455/566 |
| 2012/0098772 A1* | 4/2012 | Eun et al. | | 345/173 |
| 2012/0192093 A1* | 7/2012 | Migos et al. | | 715/773 |
| 2012/0236026 A1* | 9/2012 | Hinckley et al. | | 345/629 |
| 2013/0093705 A1* | 4/2013 | Huang | | 345/173 |
| 2014/0191983 A1* | 7/2014 | Choi et al. | | 345/173 |

* cited by examiner

*Primary Examiner* — Joe H Cheng
(74) *Attorney, Agent, or Firm* — Lee, Hong, Degerman, Kang & Waimey

(57) ABSTRACT

A mobile terminal includes a touch screen display and a controller configured to perform a first operation in response to a first touch input received at the display from a first object; perform a second operation in response to a second touch input received at the display from a second object; distinguish between the first touch input and the second touch input when both the first object and the second object are in contact with the display; and perform a third operation that is different from both the first operation and the second operation based on a gesture of the first object when both the first object and the second object are in contact with the display.

20 Claims, 12 Drawing Sheets

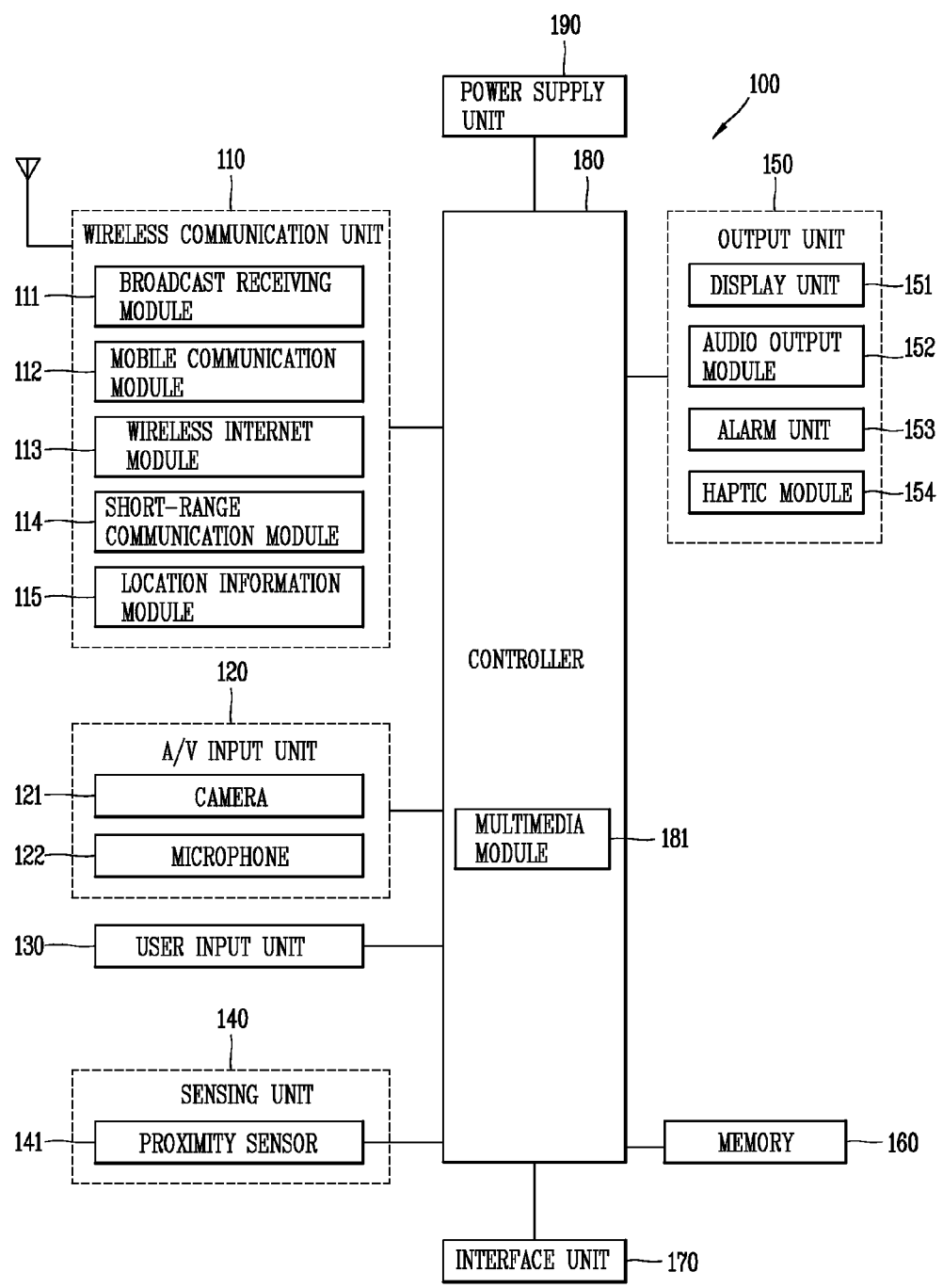

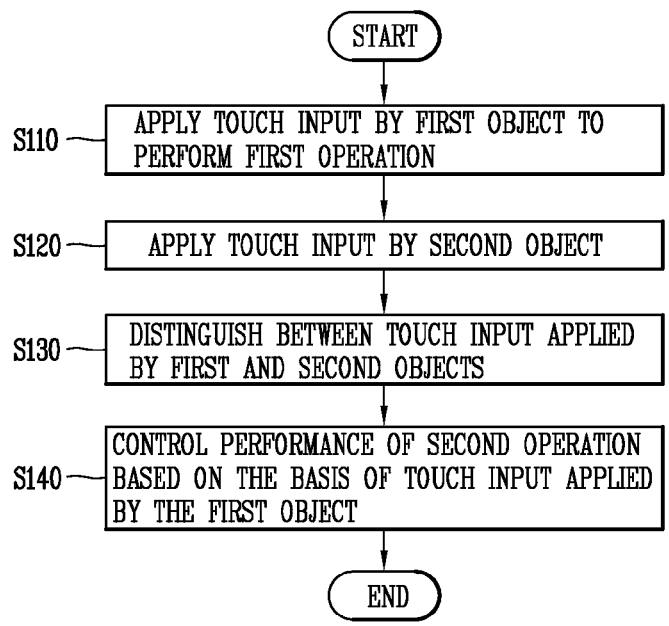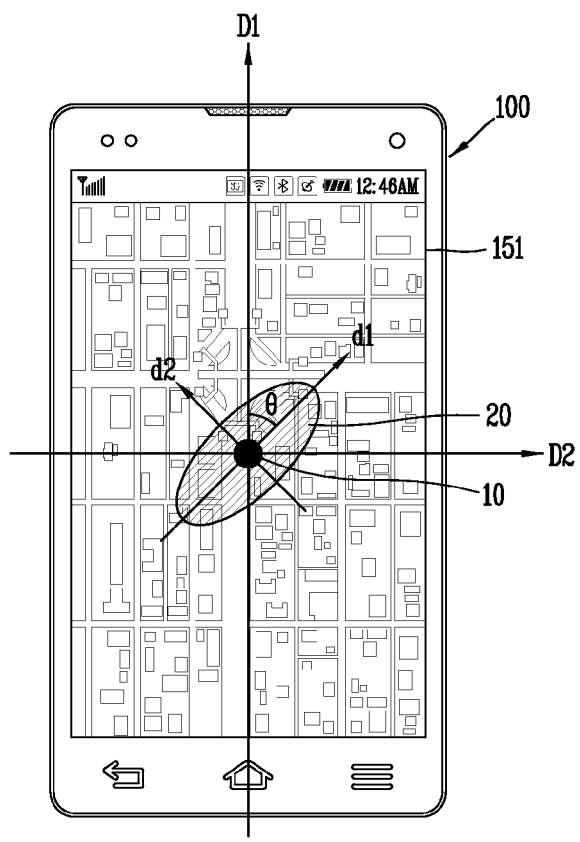

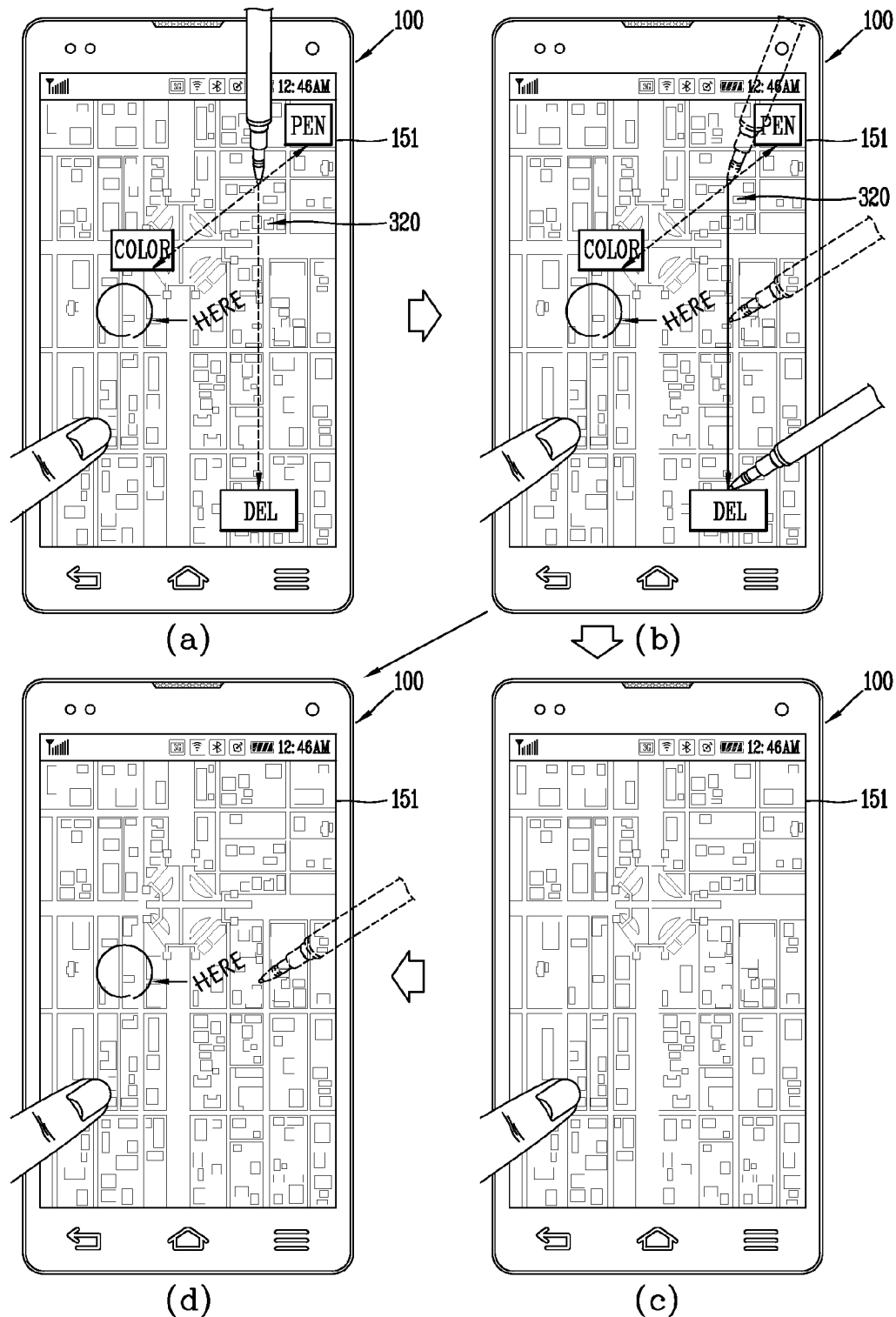

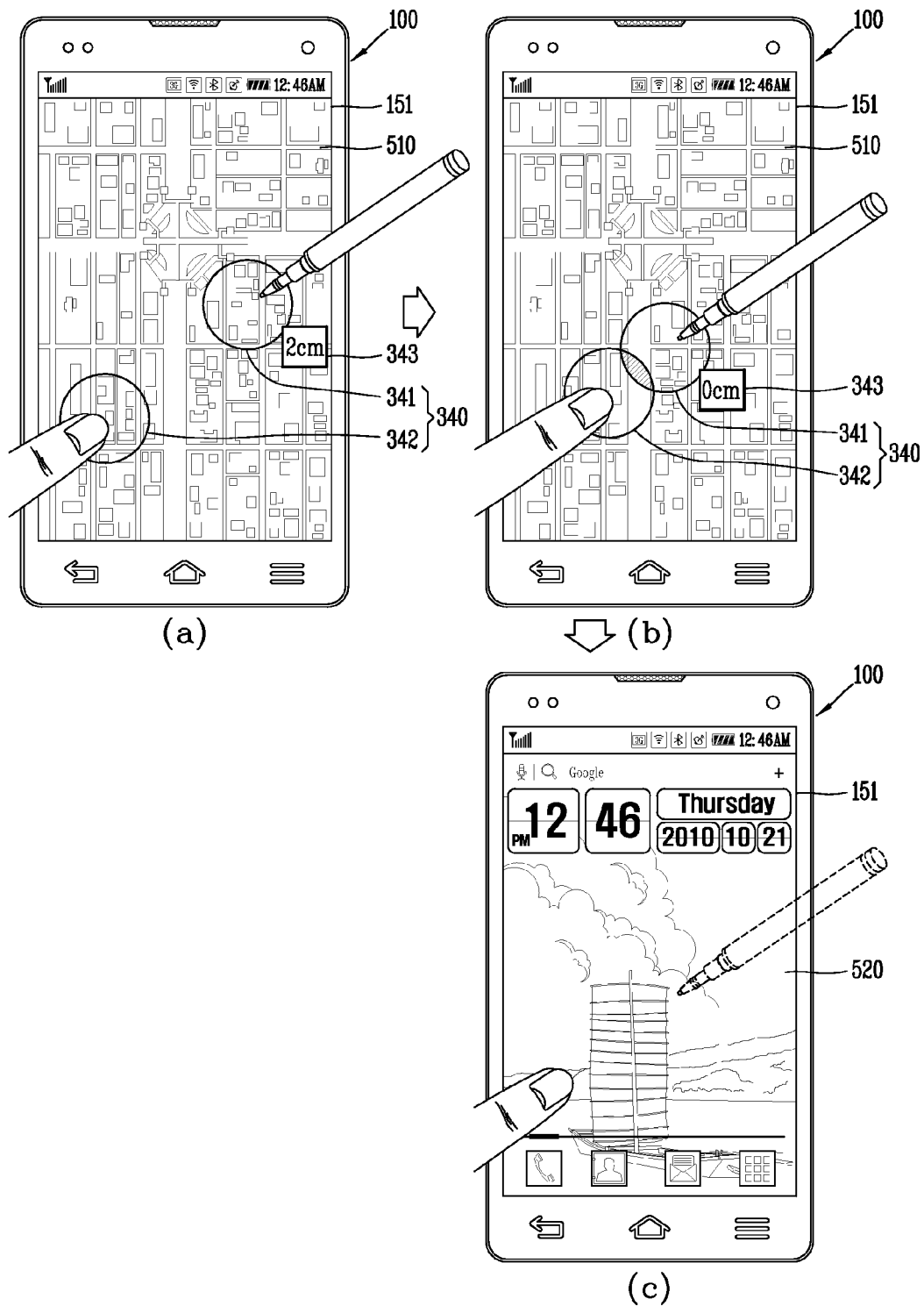

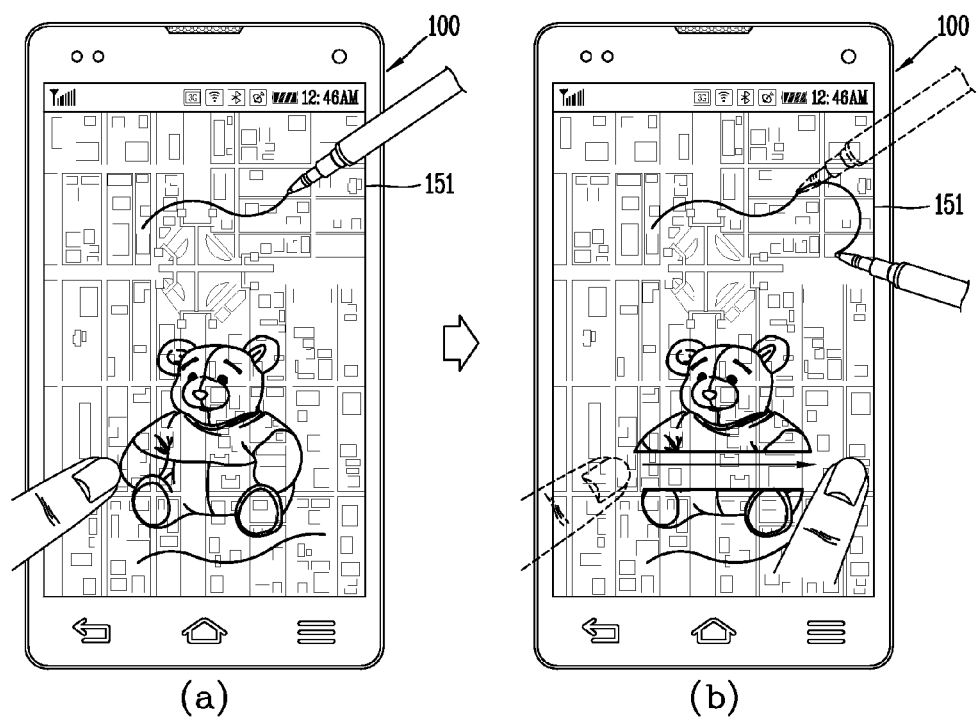

FIG. 7B
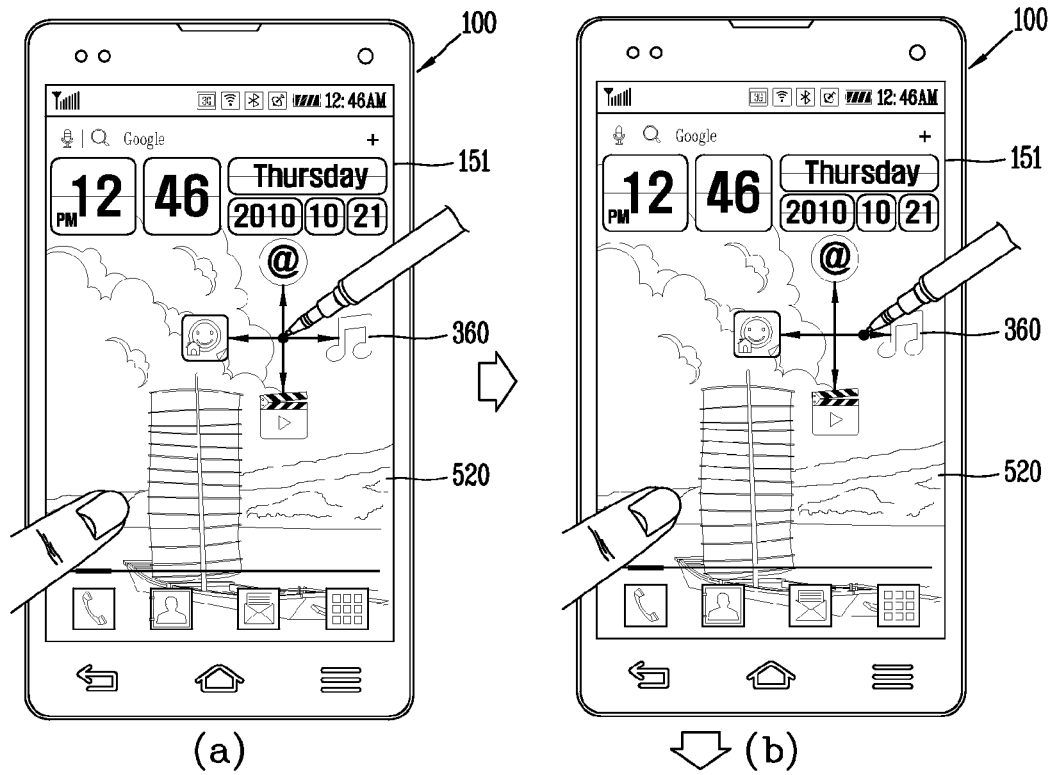
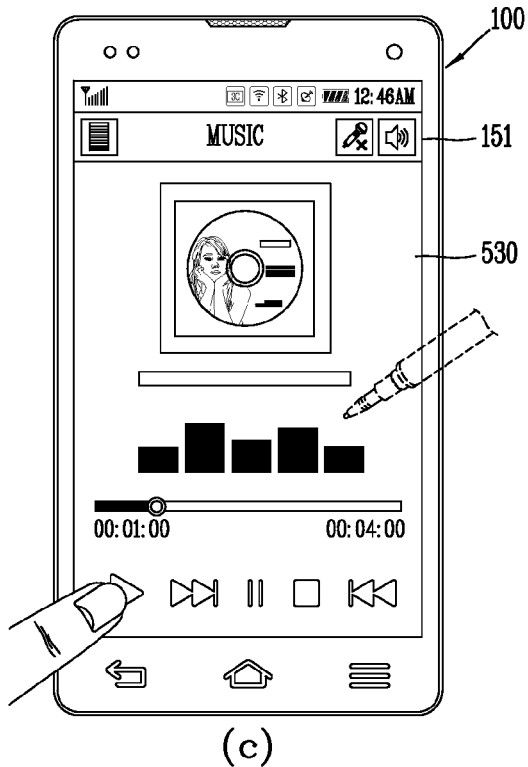

MOBILE TERMINAL AND METHOD OF CONTROLLING THE SAME

CROSS REFERENCE TO RELATED APPLICATIONS

Pursuant to 35 U.S.C. §119(a), this application claims the benefit of earlier filing date and right of priority to Korean Patent Application No. 10-2012-0138400, filed on Nov. 30, 2012, the contents of which are incorporated by reference herein in its entirety.

FIELD OF THE INVENTION

The present invention relates to a mobile terminal that can be controlled through touch inputs applied by a stylus pen and/or a user's hand.

DESCRIPTION OF THE RELATED ART

In general, terminals may be divided into a mobile terminal and a stationary terminal according to whether or not terminals are movable. In addition, mobile terminals may be divided into a handheld terminal and a vehicle mountable terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Recently, some mobile terminals have been developed for receiving a touch input using a stylus pen (or a touch pen) instead of using a finger. A stylus pen may be classified into an active type stylus pen and a passive type stylus pen. In particular, a passive stylus pen may be used to transfer an input signal to a touch screen of a mobile terminal according to a capacitive method, and a touch input applied by the passive stylus pen can result in the same effect as a touch input applied by a user's finger.

Since a stylus pen is recognized to be equivalent to a user's finger by the mobile terminal, if both the stylus pen and the user's finger are applied to the touch screen together, the touch input applied by the user's finger and the touch input applied by the stylus pen may not be distinguishable. Thus, the touch screen or a controller of the mobile terminal including the touch screen may recognize both touch inputs as the same type of input as if both touch inputs have been applied by two fingers or two stylus pens.

Therefore, when a touch input by a stylus pen is simultaneously applied to the touch screen along with a touch input by a user's finger, the mobile terminal recognizes them as a dual-touch input applied by the user's fingers or the stylus pens. In other words, even if the touch inputs are applied by two different objects or tools, i.e., using the finger and using the stylus pen, the mobile terminal cannot be controlled by distinguishing the touch input applied by the user's finger and the touch input applied by the stylus pen.

SUMMARY OF THE INVENTION

As aspect of the present invention provides a mobile terminal controlled differently according to a touch input by a stylus pen and a touch input by a user's finger.

To achieve these and other advantages and in accordance with the purpose of the present invention, as embodied and broadly described herein, the present invention according to an exemplary embodiment provides a mobile terminal including a touch screen display; and a controller configured to perform a first operation in response to a first touch input received at the display from a first object; perform a second operation in response to a second touch input received at the display from a second object; distinguish between the first touch input and the second touch input when both the first object and the second object are in contact with the display; and perform a third operation that is different from both the first operation and the second operation based on a gesture of the first object when both the first object and the second object are in contact with the display.

The present invention according to another exemplary embodiment provides a control method of a mobile terminal including performing a first operation in response to a first touch input received at a touch screen display of the mobile terminal from a first object; performing a second operation in response to a second touch input received at the display from a second object; distinguishing between the first touch input and the second touch input when both the first object and the second object are in contact with the display; and performing a third operation that is different from both the first operation and the second operation based on a gesture of the first object when both the first object and the second object are in contact with the display.

The present invention according to yet another exemplary embodiment provides a control method of a mobile terminal including determining whether a plurality of touch inputs are received on a touch screen of the mobile terminal; determining whether the received plurality of touch inputs are different types of touch inputs; distinguishing between the plurality of touch inputs that are generated by different types of touching objects; outputting a control image based on the distinguished plurality of touch inputs; sensing gestures of the plurality of touch inputs; and controlling pre-assigned operations based on the sensed gestures.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention.

FIG. 1 is a block diagram of a mobile terminal according to an exemplary embodiment of the present invention.

FIG. 3 is a flow chart illustrating a method for controlling a mobile terminal according to an exemplary embodiment of the present invention.

FIG. 4 illustrates how touch inputs applied to a touch screen by a finger and a stylus pen are distinguished.

FIGS. 5A through 5E illustrate various realization of the control method described in FIG. 3 according to exemplary embodiments of the present invention.

FIG. 6 illustrates a control method based on different control commands generated by a finger and a stylus pen according to an exemplary embodiment of the present invention.

FIGS. 7A and 7B illustrate various control methods of a mobile terminal using a control image according to an exemplary embodiment of the present invention.

DETAILED DESCRIPTION OF EXEMPLARY EMBODIMENTS

Figure 2A:
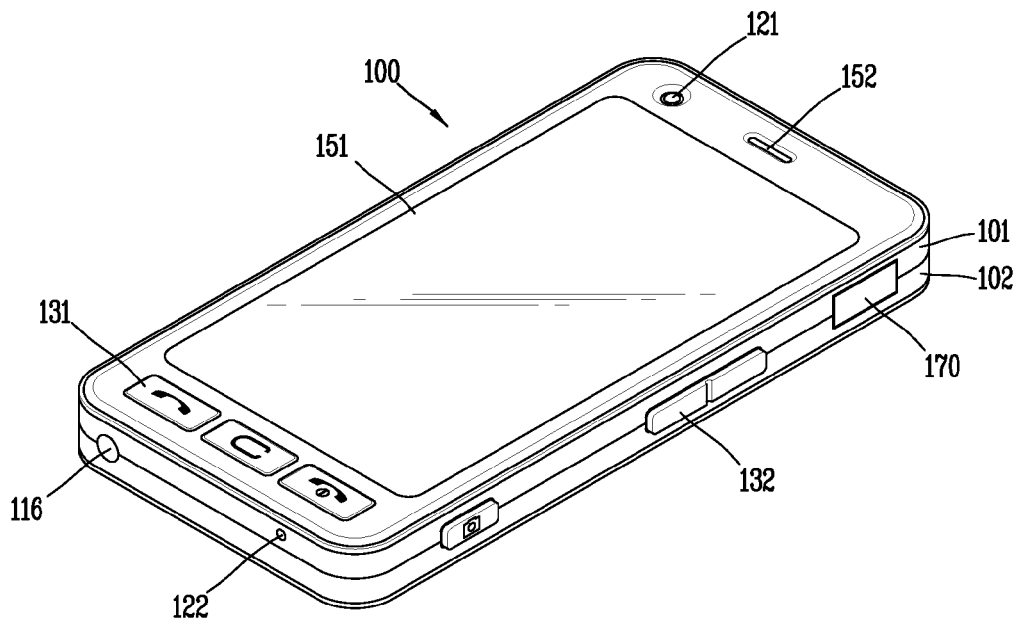
FIG. 2A is a front perspective view of a mobile terminal according to an exemplary embodiment of the present invention.

The exemplary embodiments of the present invention will now be described with reference to the accompanying drawings, in which like numbers refer to like elements throughout although the embodiments are different, and a description of the like elements for a first exemplary embodiment will be used for those of the different exemplary embodiment(s). In the following description, usage of suffixes such as 'module', 'part' or 'unit' used for referring to elements is given merely to facilitate explanation of the present invention, without having any significant meaning by itself. In describing various exemplary embodiments of the present invention, if a detailed explanation for a related known function or construction is considered to unnecessarily divert the gist of the present invention, such explanation has been omitted but would be understood by those skilled in the art. The accompanying drawings aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it would be understood by a person skilled in the art that the configuration according to exemplary embodiments of the present invention can be also applicable to the fixed types of terminals such as digital TVs, desk top computers, and the like, except for any elements especially configured for a mobile purpose.

FIG. 1 is a block diagram of a mobile terminal 100 according to an exemplary embodiment of the present invention.

With reference to FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal as having various components, but it should be understood that implementing all of the illustrated components is not a requirement. Greater or fewer components may alternatively be implemented in a mobile terminal. Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit 110 may include at least a broadcast receiving module 111, a mobile communication module 112, a wireless Internet module 113, a short-range communication module 114, or a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least a base station, an external terminal, or a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the NV input unit 120 may include a camera 121 and a microphone 122. The camera 121 processes image frames of still pictures or video obtained by an image sensor in a video capturing mode or an image capturing mode.

The image frames processed by the camera 121 may be displayed on a display unit 151. The processed image frames may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal 100. The user input unit 130 may include a keypad, a dome switch, a touch pad, a jog wheel, a jog switch, and the like.

The sensing unit 140 detects a current status of the mobile terminal 100, such as an opened or closed state of the mobile terminal 100, a location of the mobile terminal 100, the presence or absence of user contact with the mobile terminal 100 (i.e., touch inputs), the orientation of the mobile terminal 100, or an acceleration or deceleration movement and direction of the mobile terminal 100, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown in the drawings) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When the touch sensor and the display unit 151 are overlaid in a layered manner, the display unit 151 may function as both an input device and an output device. Such a display unit 151 may also be called a 'touch screen'.

When there is a touch input applied to the touch screen, a corresponding signal (signals) are transmitted to a touch controller. The touch controller processes the signals transmitted from the touch sensor and transmits corresponding data to the controller 180. Accordingly, the controller 180 may recognize which portion of the touch screen of the display unit 151 has been touched.

When the touch screen is an electrostatic type touch screen, the touch screen may detect proximity of an object (or a detection target) based on a change in an electric field according to the proximity of the object. Such a touch screen may be classified as a proximity sensor 141.

The proximity sensor 141 is a sensor for detecting the presence or absence of an object by using the force of electromagnetism or infrared rays without a physical contact. Thus, the proximity sensor 141 may have a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of an object to be sensed positioned to be close to the touch screen will be called a 'proximity touch', while recognition of actual contacting of an object to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be output to the touch screen.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, and the like). When the mobile terminal 100 is in a video call mode or image capturing mode, the display unit 151 may display a captured image and/or received image, a UI or GUI that shows videos or images and functions related thereto, and the like.

The display unit 151 may include at least a Liquid Crystal Display (LCD), a Thin Film Transistor-LCD (TFT-LCD), an Organic Light Emitting Diode (OLED) display, a flexible display, a three-dimensional (3D) display, or an e-ink display. Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, and the like). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input, and the like. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, and the like) that are input or output. In addition, the memory 160 may store data regarding various patterns of vibrations and audio signals outputted when a touch is input to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method of processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, and the like. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be output to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This may be useful in editing an image displayed on the display unit 151.

One function of the terminal 100 may be executed in case where the display unit 151 and the touch pad are touched together within a certain time range. Both touches may be clamping the terminal body with the user's thumb and index finger. The one function executed in this case may be, for example, activation or deactivation of the display unit 151 or the touch pad.

Figure 2B:
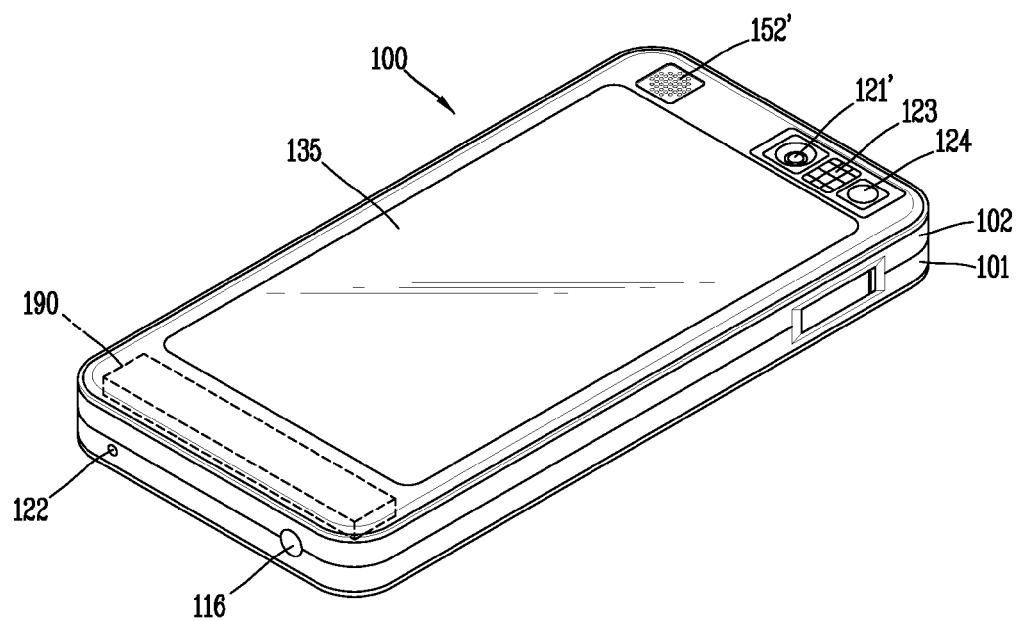
FIG. 2B is a rear perspective view of the mobile terminal of FIG. 2A

FIGS. 2A and 2B are perspective views showing an external appearance of the mobile terminal 100 according to an exemplary embodiment of the present invention. Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS), titanium (Ti), or the like.

The display unit 151, the audio output module 152, the camera 121, a first input unit 131 (one of the user input unit 130 shown in FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and as described above, may include a plurality of input units 131 and 132. The first or second input unit 131 or 132 may receive various commands. For example, the first input unit may receive commands such as start, end, scroll, or the like, and the second input unit 132 may receive commands such as adjustment of volume of a sound output from the audio output module 152, conversion to a touch recognition mode of the display unit 151, and the like.

With reference to FIG. 2B, a rear camera 121' may additionally be disposed on a rear surface of the terminal body, namely, on the rear case 102. The rear camera 121' may have an image capture direction which is substantially opposite to that of the camera 121 (See FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. The rear camera 121' may be used for the purpose of storing a high quality image. In one exemplary embodiment, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself/herself when he/she wants to capture his/her own image (i.e., self-image capturing) by using the rear camera 121'.

An audio output unit 152' may be additionally disposed on the rear surface of the terminal body. The rear audio output unit 152' may implement a stereoscopic function along with the audio output module 152 (See FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (See FIG. 1) may be installed to be drawn out of the terminal body.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (See FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

In order to control the mobile terminal 100, a control command may be applied to the display unit 151 by using various touch input objects such as a hand, a stylus pen, and the like. Hereinafter, a control command generated by use of a hand and a stylus pen and a control method of a mobile terminal based on the control command according to an exemplary embodiment of the present invention will be described.

Figure 5A:
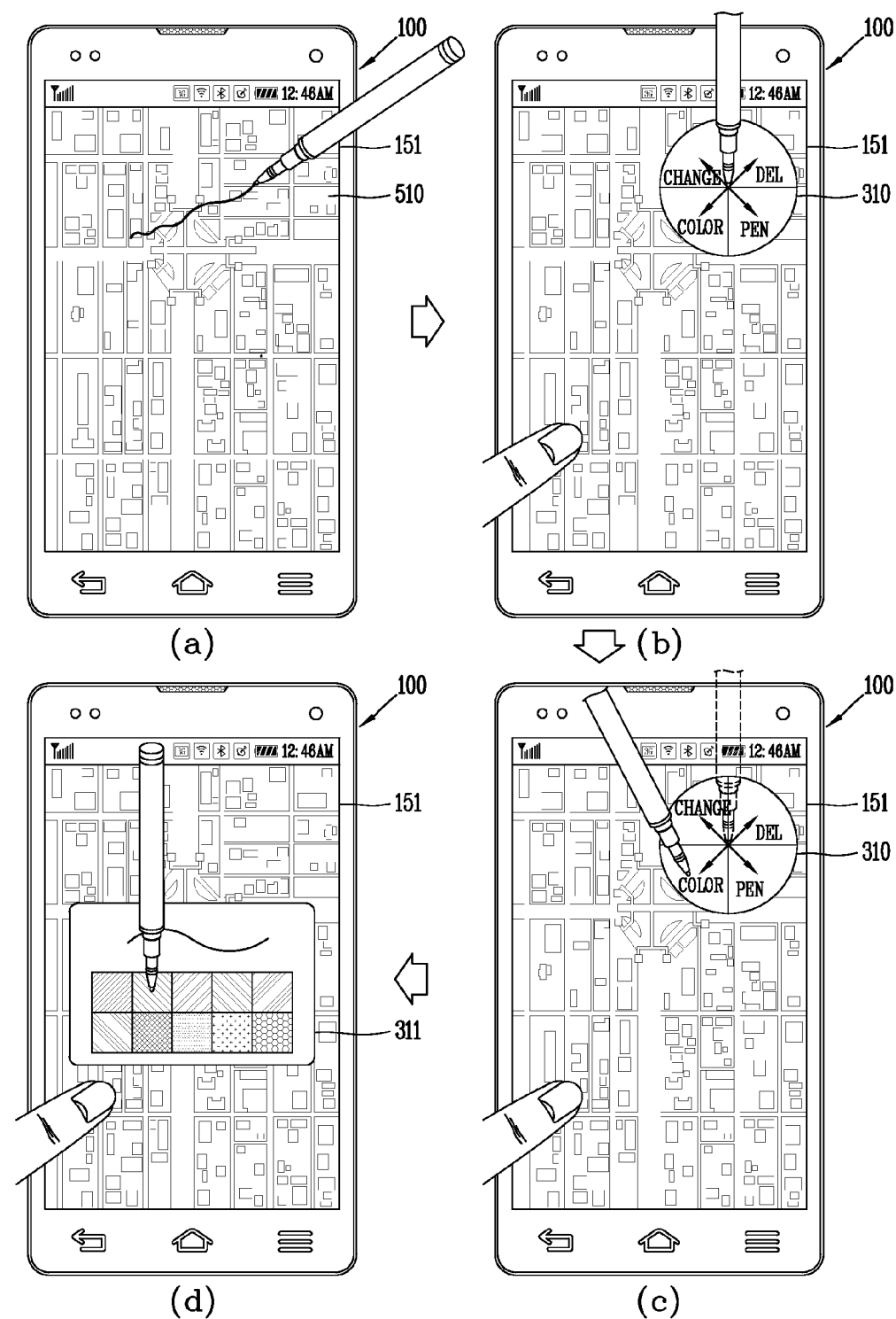

FIG. 3 is a flow chart illustrating a method for controlling a mobile terminal according to an exemplary embodiment of the present invention. FIG. 4 illustrates how control commands or inputs generated by a finger and a stylus pen are distinguished at the mobile terminal. FIG. 5A illustrates the control method of FIG. 3 according to an exemplary embodiment of the present invention.

Hereinafter, a method for controlling a mobile terminal differently based on whether a touch input is generated by a stylus pen or a finger will be described. In an exemplary embodiment of the present invention, first and second objects may correspond to a stylus pen and a finger, respectively, and for the description purpose, the first and second objects are defined as a stylus pen and a finger, respectively, in the application. However, tools for applying a touch input to the display unit 151 are not limited to the stylus pen and the finger, and the second object may be a stylus pen and the first object may be a finger.

Referring to FIG. 3, a first touch input applied by a first object for performing a first operation is received (S110). Here, the first operation may refer to any operation that may be controlled by the first object. For example, the first operation may correspond to an input of an execution command for executing a particular application. Here, the first object may be a stylus pen, for example, but is not limited thereto and the first object may be any other tool for applying a touch input.

As illustrated in (a) in FIG. 5A, in a handwriting mode (or an execution mode of a quick memo application) in which letters, pictures, and the like, may be written or drawn on a display screen of the display unit 151 such that the written information overlaps with screen information 510 displayed on the display screen, certain writing may be performed by a user while the screen information 510 is displayed on the display screen. In FIG. 5A, in the handwriting mode, the controller 180 may control the display unit 151 to output an image corresponding to the writing according to a touch input applied by the stylus pen while a map is displayed on the display unit 151.

Alternatively, even when a touch input is applied by a finger, rather than the stylus pen as described above, the controller 180 controls the display unit 151 to display the writing and map images as illustrated in FIG. 5A. Thus, in general, when a stylus pen or a user's finger applies a touch input to the display unit 151, the controller 180 controls the display unit 151 according to the same control method.

For the description purpose, in the present embodiment, a control method based on a touch input applied by a stylus pen or a finger when the mobile terminal 100 is in a handwriting mode will be described. However, the present invention is not limited thereto and may be applied to any control method for a touch input applied by a stylus pen and a finger.

After receiving the first touch input (S110) and while the first touch input by the first object is being applied to the display unit 150, a second touch input by the second object is applied to the display unit 151 (S120). Thus, both the first and second objects are in contact with a touch screen of the display unit 151 at the same time after receiving the first touch input and the second touch input. The first touch input and the second touch input may be received substantially at the same time or sequentially, the first touch input first and then the second touch input or vice versa.

The processes may be substantially the same even when the order of the first touch input and the second touch input is reversed, that is, when a touch input by the user's finger is applied before a touch input by the stylus pen is subsequently applied. Also, even when the touch inputs are substantially simultaneously, rather than sequentially, applied by the stylus pen and the finger, they are controlled in the same manner. In other words, the control method is performed in the same manner when the first touch input by the stylus pen and the second touch input by the finger are applied together to the display unit 151, irrespective of the order of the first touch input and the second touch input.

When the first touch input by the finger and the second touch input by the stylus pen are applied to the display unit 151, the controller 180 distinguishes the first touch input and the second touch input (S130). In one embodiment, the controller 180 may include a distinguishing unit for distinguishing between a first touch input applied by the stylus pen and a second touch input applied by the finger. If desired, some or all of the aspects presented herein as to the distinguishing unit may alternatively or additionally be performed by controller 180. Here, the words "first" and "second" are not necessarily used to mean the order of the touch inputs received, but are used to distinguish two different types of touch inputs. The controller 180 or distinguishing unit may distinguish between the first touch input and the second touch input based on at least their orientations or areas on the display unit 151 that are in contact with the stylus pen and the finger.

Referring to FIG. 4, the distinguishing unit recognizes shapes of the first and second touches 10 and 20 applied to the display unit 151. For example, the distinguishing unit determines orientations of the first and second touches 10 and 20 based on contact of touching objects with the display unit 151. In one exemplary embodiment, the distinguishing unit determines whether the shapes of the first and second touches have a circular or oval shape. The distinguishing unit may further determine whether a contained angle ($\theta$) between first and second axes D1 and D2 passing through the center of the display unit 151 and first and second axes d1 and d2 passing through the center of the first and second touches 10 and 20 is formed. Here, the first axis d1 may be defined as a longer-axis direction of the touch (or in an axial direction having the largest width) and the second axis d2 may be defined as a shorter-axis direction of the touch (or an axial direction having the shortest width).

When a touch applied to the display unit 151 has a circular shape, a contained angle ($\theta$) may not be formed, and when a shape of a touch applied to the display unit is not a circular shape, a contained angle ($\theta$) is formed. In general, a user's finger has a lower degree of strength or firmness, so when a user's finger is in contact with the display unit 151, the area in contact with the user's finger has a shape close to an oval shape, rather than a circular shape. A stylus pen is generally made of a hard material, so when a stylus pen touches the display unit 151, the area in contact with the stylus pen may have a substantially circular shape rather than an oval shape. Thus, the distinguishing unit may distinguish between a touch applied by a stylus pen and a touch applied by a user's finger such that a touch having a circular shape and not forming a contained angle ($\theta$) is determined as the touch applied by the stylus pen and a touch forming a contained angle ($\theta$) is determined as the touch applied by the finger.

Further, the distinguishing unit senses areas of the first and second touches to distinguish between the touch applied by the finger and the touch applied by the stylus pen. In general, a touch applied by a user's finger is measured to be approximately 30 $mm^2$. Thus, the distinguishing unit measures an area of a touch on the display unit 151, and with respect to a threshold value of approximately 30 $mm^2$, when the area of the touch is greater than approximately 30 $mm^2$, the distinguishing unit may determine that the corresponding touch is a touch applied by a user's finger, and when the area of the touch is smaller than approximately 30 $mm^2$, the distinguishing unit may determine that the corresponding touch is a touch applied by a stylus pen. Furthermore, the touch applied by the stylus pen may be recognized to have a substantially circular shape, like the first touch 10 shown in FIG. 4, due to a hard material generally used to form the stylus pen.

The order of distinguishing the first touch 10 and the second touch 20 is not restricted to the above discussed two references. The distinguishing unit may also distinguish the touches by using only any one of the two references or using both or more references.

When the first touch input by the first object and the second touch input by the second object are applied together substantially at the same time or sequentially, the controller 180 controls a second operation performed in response to the second touch input based on the first touch input (S140).

Referring to (a) and (b) in FIG. 5A, while the first touch input by the stylus pen is being applied to the display unit 151, a second touch input is applied by the finger to the display unit 151. The distinguishing unit distinguishes between the first touch input and the second touch input, and also senses positions of the first and second touch inputs on the display unit 151.

The controller 180 controls the display unit 151 to display a first control image 310 in close proximity to a first touch spot on the display unit 151 to which the first touch input has been applied by the stylus pen when the second touch input is applied to the display unit 151. For example, the first control image 310 may be formed as a circular window in close proximity to the first touch spot.

The first control image 310 is formed on the display unit 151 to receive a further touch input applied by the stylus pen. For example, the first control image 310 may include regions divided into to control execution of a display type (a type of pen) of writing formed along the stylus pen in the handwriting mode, a display color (color of the pen) of writing, conversion into an erasure mode, and entire deletion. Description of execution operations such as 'conversion', 'erasure', 'color', and 'pen', and the like, may be displayed in the respective regions of the first control image 310.

Referring to (c) in FIG. 5A, in response to a touch input applied by the stylus pen to one of the divided regions in the first control image 310, the controller 180 controls the display unit 151 to perform a touched one of the execution operations. In one embodiment, the touch input applied by the stylus pen to the one region may be a dragging touch input starting from the center of the first control image 310.

Referring to (d) in FIG. 5A, the controller 180 controls the display unit 151 to display a color display window 311 allowing for selection of a color from a plurality of colors in response to the touch input applied to the region of the first control image 310 indicated by 'color'. It is noted that the second touch input by the finger is continuously applied to the display unit 150 during the above described operations referring to (b)-(d) in FIG. 5A. Although not shown in the drawings, when the second touch input by the finger applied to the display unit 150 is released, the controller 180 may control the display unit 151 to make the color display window 311 disappear, and generate the writing according to the touch input applied by the stylus pen.

In one exemplary embodiment, as shown in (a) of FIG. 5A, when only the stylus pen (first touch input) is applied to the display unit 151, a writing operation is performed according to movement of the stylus pen on the display unit 151 until the second touch input by the finger is also applied to the display unit 151. While the writing operation is stopped after receiving the second touch input, once the finger is removed from the display unit 151, the writing operation may be resumed.

For example, when the first touch input by the stylus pen is applied to the display unit 151 and the second touch input by the finger is applied to the display unit 151, the controller 180 recognizes the second touch input as a second control command for changing a type of writing, or the like, which is different from a first control command for generating writing on the display screen of the display unit 151, and controls the display unit 150 to display an operation associated with the second control command.

In one exemplary embodiment, when the touch input applied by the stylus pen to the first control image 310 is released, the controller 180 controls the mobile terminal 100 to perform an operation according to the second control command. A point in time at which the second control command is performed may be a point in time at which the touch input applied by the stylus pen is released. However, the present invention is not limited thereto. For example, the second control command may be set to be executed when the touch input by the stylus pen is continued for a pre-set period of time (e.g., for several seconds) or immediately when the touch input by the stylus pen is applied to the first control image 310. However, the present invention is not limited thereto. For example, the controller 180 may recognize the touch input applied by the user's finger, as a first control command for generating writing on the screen information, and when the touch input by the stylus pen is applied, the controller 180 may recognize the touch input by the stylus pen, as a second control command and control the display unit 151 accordingly.

The controller 180 may control an operation of the mobile terminal 100 as well as the display unit 151 according to the second control command, and a controlled function is not limited thereto. According to an exemplary embodiment of the present invention, a first touch input applied by the stylus pen and a second touch input applied by the user's finger are distinguished, and when the first and second touch inputs are applied together to the display unit 151, a type of control command is changed based on any one of the first and second touch inputs. Thus, the user may be able to input a completely different control command to the mobile terminal 100 by using his or her finger or the stylus pen.

A method of inputting a new control command based on the touch inputs by a finger and a stylus pen is not limited to displaying the demarcated second control image. Hereinafter, a control method of inputting a new control command will be described.

FIG. 5B illustrates the control method of FIG. 3 according to another exemplary embodiment of the present invention. A display method of the display unit 151 for informing a user about a method for inputting a new control command will be described with reference to FIG. 5B. Except for a display method for inputting a control command, the method includes the substantially same operations as those operations described in FIG. 5A, so a description thereof will be omitted.

Referring to FIG. 5B, the controller 180 controls the display unit 151 to output a second control image 320 when a first touch input by the stylus and a second touch input by the finger are applied together, simultaneously or sequentially, to the display unit 151. In order to apply the second control command, the second control image 320 includes at least one touch path. Based on the first touch input applied by the stylus pen along each touch path, the controller 180 controls the display unit 151 according to the second control command matched to each touch path.

For example, the second control image 320 includes first to third touch paths extending in different directions. In the drawing, the first to third touch paths are illustrated to have a linear line, but the present invention is not limited thereto. For example, the first to third touch paths may be formed to be curved or the first to third touch paths may be formed to overlap with each other. The touch paths are formed such that the user may apply a touch input along the paths by using the stylus pen or finger.

The second and third touch paths have designated end points. The end points are defined as the ends of the touch paths. The second control image 320 may be displayed to be adjacent to the respective end points of the first to third touch paths, and include control commands corresponding to the respective touch paths. Thus, the user may recognize the control commands corresponding to the respective touch paths.

Referring to (b) and (c) in FIG. 5B, the display unit 151 may display control commands with 'pen', 'color', and 'erase' (DEL) such that they are adjacent to respective end points of the first to third touch paths. In response to a touch input applied by the stylus pen along the touch path having a control command 'erase' in an end point thereof, the controller 180 controls the display unit 151 to erase writing previously input to the screen information of the display unit 151. While the controller 180 recognizes that the control command 'erase' has been input when the touch input is applied by the stylus pen to the end point of the touch path and controls the display unit 151 accordingly, when the touch input applied by the stylus pen along the touch path is not applied to the end point or the touch input by the stylus pen is applied only to a certain region of the touch path, the controller 180 determines that a second control command is not received.

Referring to (b)-(c) in FIG. 5B, when the touch input applied by the stylus pen is released at a halfway point of the touch path (as indicated by the dotted line of the stylus pen in (b)), the controller 180 determines that the control command is not received. As illustrated in (d), when the touch input by the stylus pen is not applied to the end point of the touch path, the writing previously input to the screen information is not erased. The writing previously input to the screen information is erased as shown in (c) only when the touch input by the stylus pen is applied to the end point of the touch path where 'DEL' is displayed as shown in (b). Accordingly, various touch paths can be formed, and since a control command is not input until a touch input applied by the stylus pen reaches the end point and description of the control command is displayed near the end point, the user can input a second control command more easily and accurately.

Figure 5C:
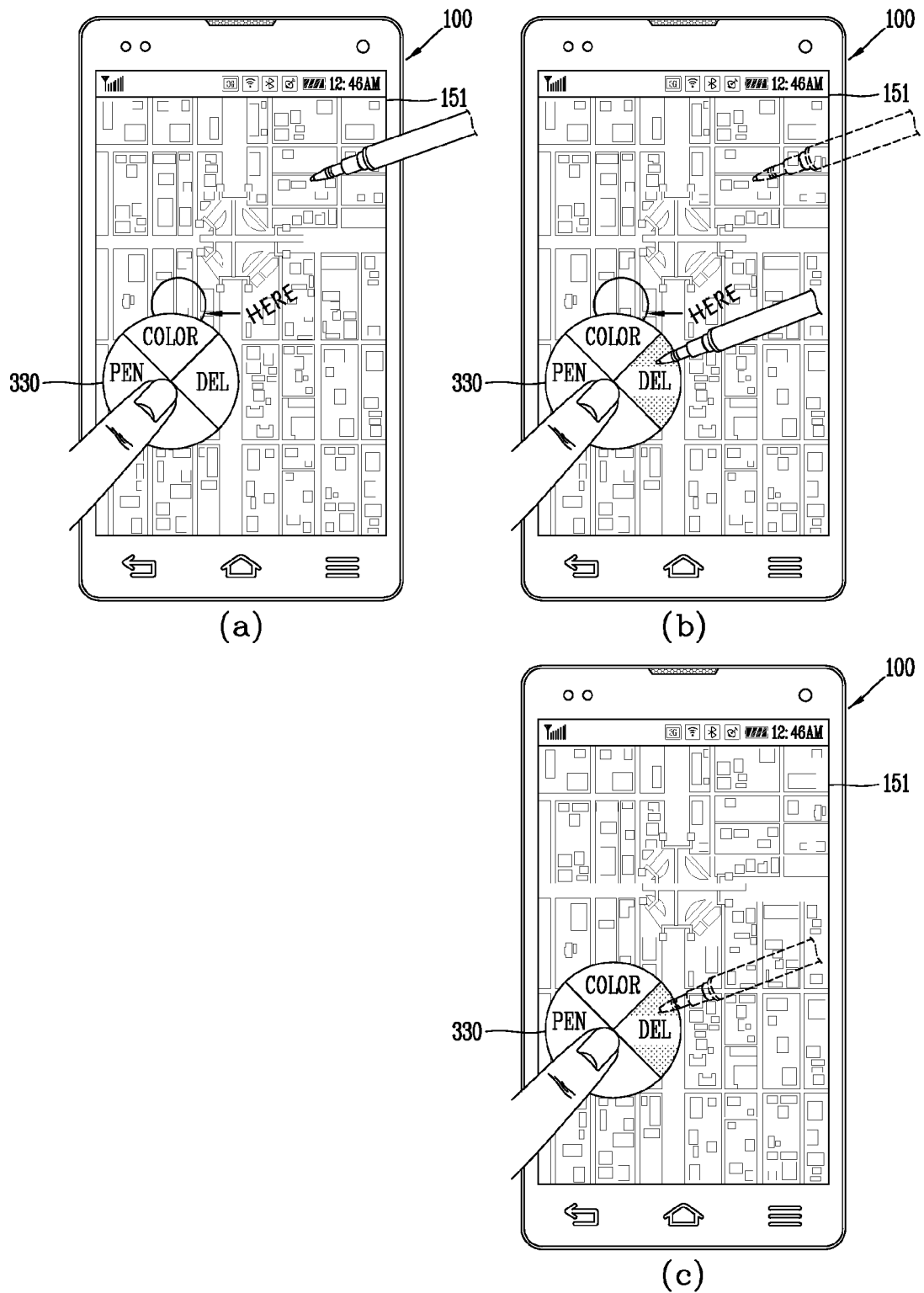

FIG. 5C is a flow chart illustrating a control method in FIG. 3 according to another exemplary embodiment of the present invention. A control method by a third control image 330 output in close proximity to a touch spot on the display unit 151 in response to a touch input applied by a finger will be described with reference to FIG. 5C. Except for the third control image 330, the control method includes the substantially same operations as those of FIG. 5A, so a description thereof will be omitted.

Referring to (a) in FIG. 5C, when a first touch input by the stylus pen and a second touch input by the finger are applied to the display unit 151, the controller 180 controls the display unit 151 to output the third control image 330 such that the output third control image 330 is displayed adjacent to the touch spot at which the second touch input is received.

As illustrated in the drawing, the third image 330 may have a circular shape having the touch spot at the center. Also, the third control image 330 may include a plurality of control regions corresponding to a plurality of control commands and the display unit 151 may display description of each control command in the respective control region. For example, 'pen', 'color', and 'erase' (DEL) may be displayed in the respective control regions.

Referring to (b) and (c) in FIG. 5C, the controller 180 controls the display unit 151 in response to a touch input applied by the stylus pen to a region of the display unit 151 displaying the third control image 330. For example, when the touch input by the stylus pen is applied to a control region of the third control image, the controller 180 recognizes a control command corresponding to the control region touched by the stylus pen, and controls the mobile terminal 100 according to the control command.

When the stylus pen is moved to the third control image 330 as shown in (b), the touch input by the stylus pen may be continuously applied to the display unit 151. Also, in the present embodiment, when the third control image 330 is output via the display unit 151, the controller 180 may control the display unit 151 to maintain displaying of the third control image 330 for a pre-set period of time (e.g., several seconds) even when the touch input applied by the stylus pen to the display unit 151 is released. In this case, the user may releases the touch applied by the stylus pen to the display unit 151 and apply the touch input directly to the third control image 330 as shown in (c).

When a touch input by the stylus pen is applied to a control region of the third control image 330, the controller 180 may control the display unit 151 to generate a highlighting effect in the control region. As illustrated in the drawing, when a touch input by the stylus pen is applied to the control region indicated as 'erase' (DEL), the controller 180 may control the display unit 151 to generate the highlighting effect in the control region as shown in (b) and (c). According to the present embodiment, since a touch input can be applied to the control image by moving the stylus pen, which has a relatively small tip compared to a finger, the user can easily apply a control command.

FIG. 5D is a flow chart illustrating the control method of FIG. 3 according to another exemplary embodiment of the present invention. A control method of the mobile terminal 100 by a fourth control image 340 displayed in close proximity to touch spots on the display unit 151 in response a first touch input applied by the finger and a second touch input applied by the stylus pen will be described with reference to FIG. 5D. Except for the fourth control image 340, the control method includes the substantially same operations as those of FIG. 5A, so a description thereof will be omitted.

Referring to (a) in FIG. 5D, the controller 180 controls the display unit 151 to output first and second images 341 and 342 such that the displayed images are adjacent to touch spots on the display unit 151 to which the first and second touch inputs are applied. The first and second images 341 and 342 may be set to have a circular shape having their respective touch spots at the center thereof. Also, the controller 180 may control the display unit 151 to display a distance 343 between the two touch spots.

Referring to (b) in FIG. 5D, when the stylus pen and the finger are moved on the display unit 151 while the touch inputs are being applied to the display unit 151 outputting the first screen image 510, the controller 180 controls the display unit 151 to move the displayed first and second images 341 and 342 according to the movement of the stylus pen and the finger. Here, the first screen information 510 includes every screen information output by the display unit 151, and there is no limitation in the first screen information. For example, as illustrated in FIG. 5D, the first screen information 510 may be a map showing a pre-set region.

When the first and second images 341 and 342 come close according to the movement of the stylus pen and the finger, the controller 180 controls the display unit 151 to sense and display the distance 343 between the touch spots. In particular, when the touch spots come close to be within a pre-set distance, the controller 180 may control the display unit 151 to display the first and second images 341 and 342 overlapping with each other as shown in (b).

When the first and second images 341 and 342 overlap with each other, the controller 180 recognizes that a pre-set second control command has been applied, and controls the mobile terminal 100 based on the second control command. For example, when the stylus pen and the finger are moved on the display screen such that the first and second images 341 and 342 overlap with each other, the controller 180 controls the display unit 151 such that the first screen information 510 is switched to second screen information 520. Here, the second screen information 520 is not limited in type. For example, as illustrated in (c) of FIG. 5D, it may be a home screen including at least one icon matched to an application, a background image, time, and date information. Thus, the user may easily switch the screen information by using the stylus pen and the finger.

However, the control command input by the first and second images 341 and 342 are not limited thereto. For example, it may be set such that mute execution, deactivation execution of the display unit 151, and the like, may be set to be controlled by the second control command.

Figure 5E:
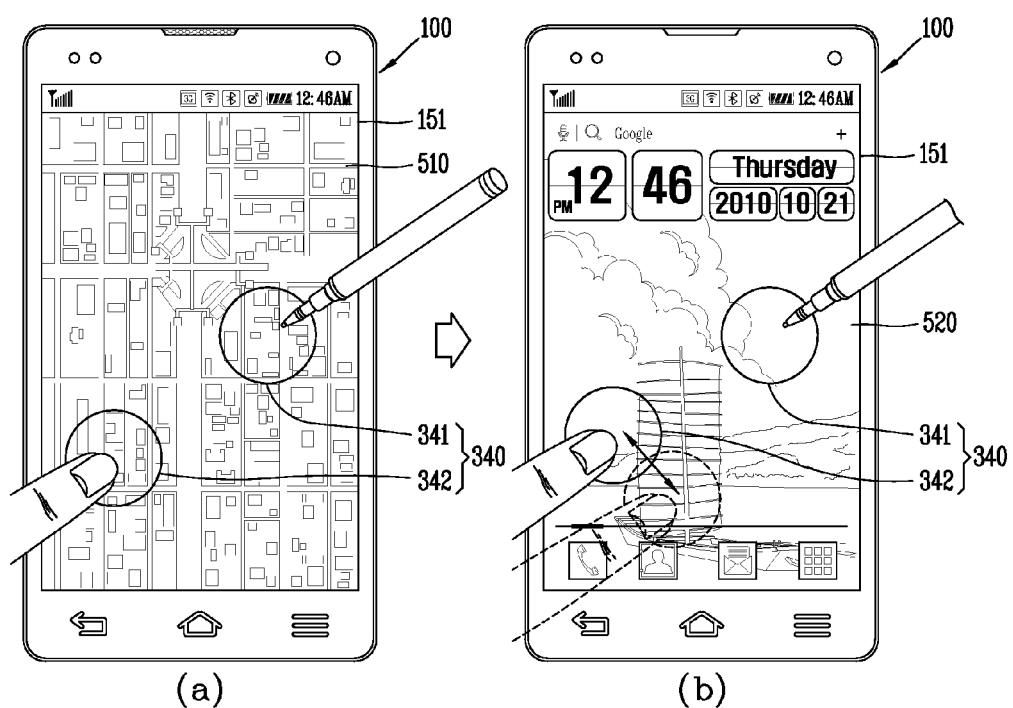

FIG. 5E is a flow chart illustrating the control method in FIG. 3 according to another exemplary embodiment of the present invention. A method for controlling the mobile terminal by a finger's gesture will be described with reference to FIG. 5E. Except for a configuration regarding an application of a control command based on a hand's gesture, the control method includes the substantially same operations as those of FIG. 5D, so a description thereof will be omitted.

Referring to (a) in FIG. 5E, when touch inputs applied by the finger and the stylus pen are applied to the display unit 151 displaying the first screen information 510, the controller 180 controls the display unit 151 to output a fourth control image 340, as also shown in (a) of FIG. 5D.

Referring to (b) in FIG. 5E, the controller 180 controls the display unit 151 to switch the first screen information 510 to the second screen information 520 based on the finger's gesture. The finger's gesture may be a touch input in a rubbing manner applied to the display unit 151, but the present invention is not limited thereto. For example, the finger's gesture may correspond to a double touch scheme, a touch input according to a pre-set pattern, and the like.

Further, controlling based on the hand's gesture is not limited to the changing of the screen information. For example, mute execution, deactivation execution of the display unit 151, and the like, may be controlled by a finger gesture. Furthermore, in the present embodiment, the mobile terminal 100 may be controlled by the first to fourth control images 310, 320, 330, and 340 described above with reference to FIGS. 5A through 5E.

Thus, according to the present embodiment, besides controlling based on the touch inputs applied by the finger and the stylus pen, when touch inputs applied by the finger and the stylus pen are applied together to the display unit 151, a different control command may be generated. Thus, various control commands may be implemented by using the finger and the stylus pen.

FIG. 6 illustrates a control method based on different control commands generated in response to touch inputs by a finger and a stylus pen. When touch inputs by the finger and the stylus pen are applied together to the display unit 151, the controller 180 generates a third control command based on the touch input by the finger and the touch input by the stylus pen.

In one exemplary embodiment, when a touch input by one of the finger and the stylus pen is applied to the display unit 151, the same control command is generated, but when a touch input by the finger and a touch input by the stylus pen are applied together, different control commands are generated. In another exemplary embodiment, any one of the touch inputs applied by the finger and the stylus pen may be set to be the same as a control command generated by the touch input applied by the hand independently and the touch input applied by the stylus pen independently.

Referring to FIG. 6, when touch inputs are applied together by the finger and the stylus pen, the controller 180 may recognize the touch input applied by the finger as a first control command for deleting the previously input writing and the touch input applied by the stylus pen as a second control command for generating writing on the screen information, and control the display unit 151 according to the first and second control commands. Thus, the user may simultaneously apply the control commands for inputting writing and erasing writing by using both the finger and the stylus pen.

When a touch input is applied to the display unit 151 by any one of the finger and the stylus pen, it may be recognized as a control command for generating writing. Further, the touch input by any one of the finger and the stylus pen may be set as a control command for selection or execution, rather than generation or deletion control command. In this case, when touch inputs are applied together by the finger and the stylus pen, the controller 180 may control the mobile terminal 100 such that the mobile terminal enters a handwriting mode as shown in (a), and generation and deletion control commands are generated simultaneously as shown in (b).

Figure 7A:
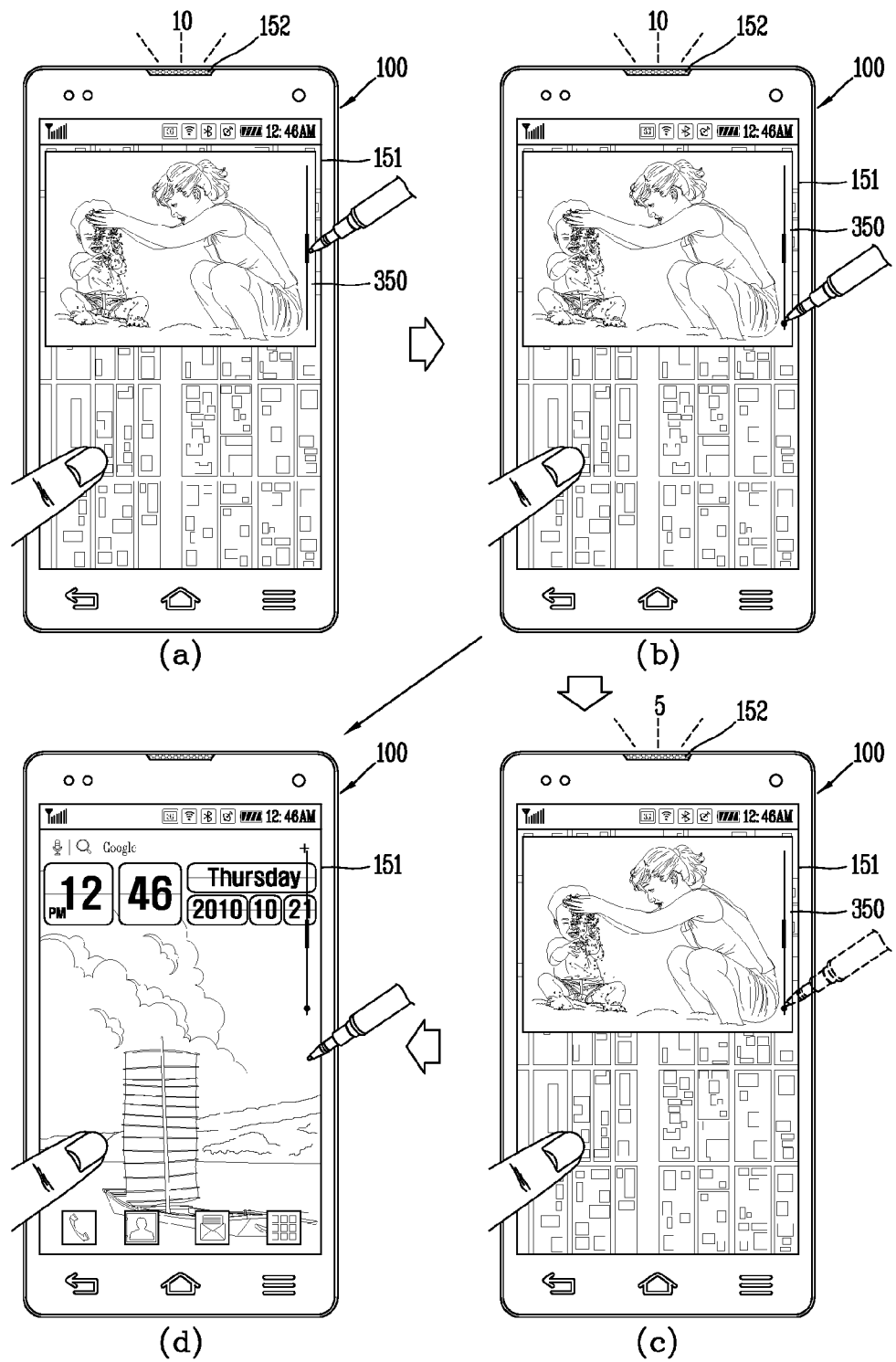

FIGS. 7A and 7B illustrate various control methods of a mobile terminal using a control image. A control method of applying different control commands when different touch inputs are applied to a control image will be described with reference to FIG. 7A. Referring to (a) in FIG. 7A, the display unit 151 outputs a video that shows different images over time, and a speaker outputs a sound of the video according to the passage of time. The controller 180 controls the display unit 151 to output a fifth control image 350 on the basis of touch inputs applied by the hand and the stylus pen while the video is being played. The fifth control image 350 is output to have a shape extending in opposite directions along the touch input applied by the stylus pen to the display unit 151.

Referring to (b) and (c) in FIG. 7A, a touch input applied by the stylus pen is moved in one direction along the fifth control image 350, and when the touch input is released from an end point of the fifth control image 350, the controller 180 may control the speaker to adjust volume of the sound. For example, when the touch input applied by the stylus pen is moved along the fifth control image 350 from the touch spot of the stylus pen, the controller 180 recognizes it as a control command for controlling to turn down a volume of the sound. When the touch input applied by the stylus pen moving along the fifth control image 350 is released from one region, the controller 180 may control the speaker to adjust volume of the sound to a volume corresponding to the one region.

Also, when the touch input applied by the stylus pen is applied to the end point of the fifth control image 350, the controller 180 may control the speaker to mute the sound. Further, when the controller 180 senses a distance along which the stylus pen is moved starting from a first touch spot, it generates a control command for changing an object such that the object is changed in proportion to the sensed distance.

Referring to (b) and (d) in FIG. 7A, when the touch input applied by the stylus pen is applied to pass through the end point of the fifth control image 350, the controller may recognize that a different control command is applied. For example, as illustrated in the drawings, when the touch input applied by the stylus pen is moved along the fifth control image 350 and a touch input is applied to a region passing through the end point, the controller 180 may control the display unit 151 and the speaker to terminate playing of the video.

Also, when a touch input is applied to a region passing through the end point, the controller 180 may control the display unit 151 to change screen information applied to the display unit 151. Since different control commands are matched according to types of touch inputs applied to the fifth control image, controlling may be variously performed by using a simple control image.

FIG. 7B illustrates a control method for executing an application by using a control image. Referring to (a) in FIG. 7B, when touch inputs by the finger and the stylus pen are applied to the display unit 151 displaying the second screen information 520, the controller 180 controls the display unit 151 to output a sixth control image 360.

The sixth control image 360 includes at least one icon for receiving an execution command for executing each application. For example, the sixth control image may include two straight lines in a direction in which they cross each other, and include icons of respective applications output to be adjacent to end points of the respective straight lines.

When the touch input applied by the stylus pen moves in one direction and is released from an end point adjacent to a single icon, the controller 180 controls the mobile terminal 100 to execute an application matched to the single icon. The controller 180 controls the display unit 151 to convert the second screen information 360 into third screen information 530 and make the sixth control image 360 disappear.

An icon included in the sixth control image 360 may be designated according to a user setting. For example, the user may set an icon for a frequently used application as an icon included in the sixth control image 360. Accordingly, the user may execute an application through the control image more conveniently.

Figure 8:
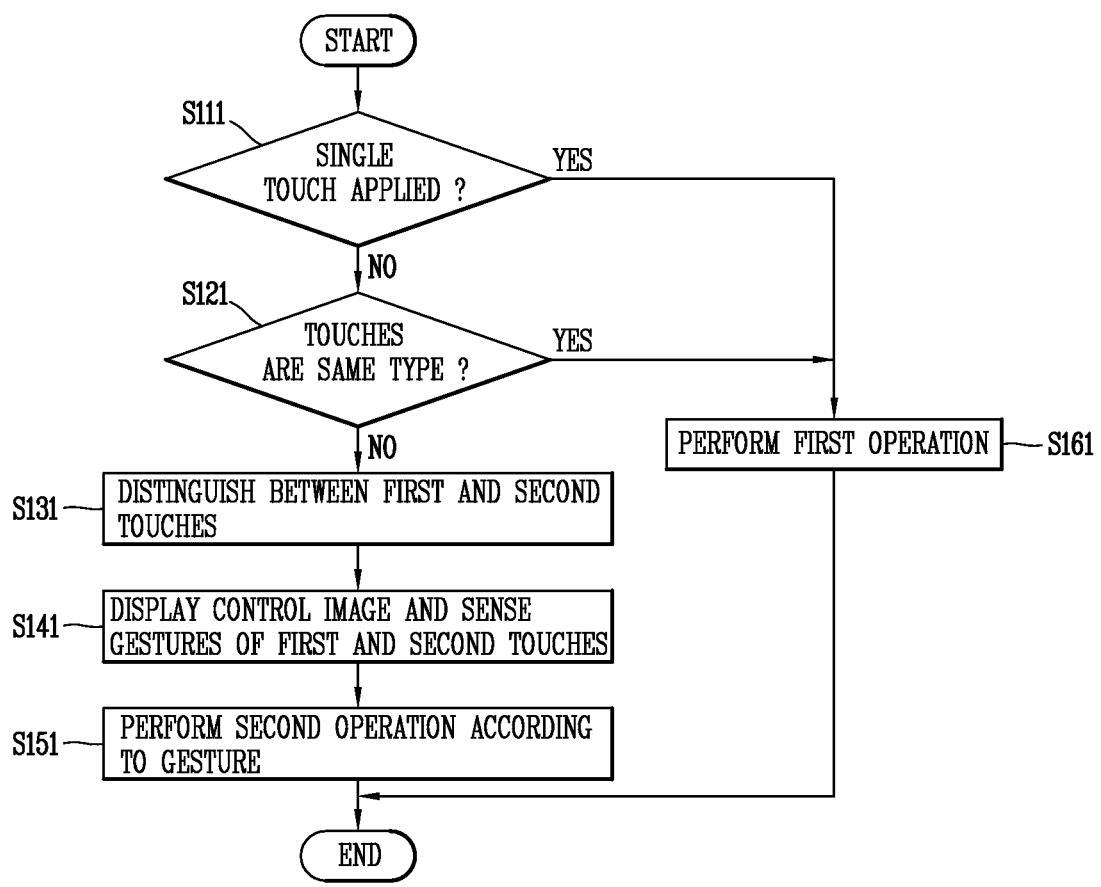
FIG. 8 is a flow chart illustrating a control method according to another exemplary embodiment of the present invention.

FIG. 8 is a flow chart illustrating a control method according to an exemplary embodiment of the present invention. A method for controlling a mobile terminal based on touch inputs applied by two tools will be described with reference to FIG. 8.

The controller 180 determines whether only a single touch or more than one touches is applied to the display unit (S111). Even if a plurality of touch inputs are received on the display unit 151, when a distance between the plurality of touch inputs is smaller than a pre-set distance, the plurality of touch inputs may be considered as a single touch. When the applied touches are determined as a single touch, the controller 180 controls the mobile terminal 100 to perform a first operation based on the applied singe touch (S161).

In S111, when the touches are determined as a plurality of touches, the controller 180 may determine whether the plurality of touches are the same types of touches (S121). Whether the touches are determined to be different types of touches has been described above with reference to FIGS. 3 and 4, so a detailed description thereof will be omitted. As described above, the distinguishing unit may determine types of the touches applied to the display unit 151 based on the areas and orientations of the touches.

When the touches are the same type of touches in S121, the controller 180 may control the mobile terminal 100 to perform the first operation based on the same type of the plurality of applied touches. (S161)

When the touches are determined as different types of touches, the controller 180 distinguishes between the first and second touches (S131). For example, the controller 180 determines that the first touch is a touch applied by the stylus pen and the second touch is a touch applied by the finger.

Further, the controller 180 outputs a control image based on the first and second touches and senses gestures of the first and second touches (S141). The controller 180 controls the mobile terminal 100 to perform a second operation that is different from the first operation based on the gestures.

When the different types of first and second touches are applied together to the display unit 151, the mobile terminal 100 is controlled to perform an operation different that is different from the operation that is performed when the same type of first touches are applied to the display unit 151. Thus, the controller 180 may distinguish between the first and second touches and control the mobile terminal 180 accordingly.

The mobile terminal according to the exemplary embodiments described above is not limited in its application of the configurations and methods, but the entirety or a portion of the embodiments can be selectively combined to be configured into various modifications. As the exemplary embodiments may be implemented in several forms without departing from the characteristics thereof, it should also be understood that the above-described exemplary embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a touch screen display; and
a controller configured to:
   perform a first operation in response to a first touch input received at the display from a first object;
   perform a second operation in response to a second touch input received at the display from a second object;
   distinguish between the first touch input and the second touch input when both the first object and the second object are in contact with the display; and
   perform a third operation that is different from both the first operation and the second operation based on a gesture of the first object when both the first object and the second object are in contact with the display.

2. The mobile terminal of claim 1, wherein the controller is further configured to distinguish between the first touch input and the second touch input based on different shapes of a first area on the display that are in contact with the first object and a second area on the display that are in contact with the second object.

3. The mobile terminal of claim 2, wherein the controller is further configured to distinguish between the first touch input and the second touch input based on at least sizes or orientations of the first area and the second area.

4. The mobile terminal of claim 1, wherein the controller is further configured to control the display to display at least one control image for receiving a control command for performing the third operation when both the first touch input and the second touch input are received together on the display.

5. The mobile terminal of claim 4, wherein the at least one control image is divided into at least two regions corresponding to different control commands for performing different operations, and a third touch input is selectively received from the first object at one of the at least two regions to perform an operation corresponding to the selected one of the at least two regions.

6. The mobile terminal of claim 5, wherein the controller is further configured to control the display to display the at least one control image on at least one of two touch areas at which the first touch input and the second touch input were received.

7. The mobile terminal of claim 6, wherein the controller is further configured to:
   control the display to display a first image at a first touch area on the display where the first touch input has been received and a second image at a second touch area on the display where the second touch input has been received, a first point in contact with the first object being a center of the first image and a second point in contact with the second object being a center of the second image; and
   perform the third operation when the first image moves according to movement of the first object, the second image moves according to movement of the second object, and the moved first image and the moved second image overlap with each other.

8. The mobile terminal of claim 6, wherein the controller is further configured to control the display to display the at least one control image for a pre-set period of time when the first touch input and the second touch input are released.

9. The mobile terminal of claim 6, wherein the at least one control image comprises at least one icon representing at least one application and the controller is further configured to control the display to execute an application corresponding to one of the at least one icon in response to a third touch input generated by the first object at the one of the at least one icon.

10. The mobile terminal of claim 4, wherein the at least one control image comprises at least one touch path extending in different directions and the controller is further configured to perform the third operation in response to a third touch input received from the first object along one of the at least one touch path.

11. The mobile terminal of claim 10, wherein the one of the at least one touch path comprises an end point at an end portion of the one of the at least one touch path and the controller is further configured to perform the third operation when the third touch input is received at the end point.

12. The mobile terminal of claim 11, wherein the controller is further configured to perform a fourth operation that is different from the third operation when the third touch input is released at a point on the one of the at least one touch path without touching the end point.

13. The mobile terminal of claim 10, wherein the controller is further configured to perform the third operation partially in proportion to a length of the one of the at least one touch path along which the third touch input has been received.

14. The mobile terminal of claim 1, wherein the third operation is performed when the first object and the second object are of different types and the controller is further configured to perform the first operation based on a gesture of the second object when the first object and the second object are of a same type.

15. A control method of a mobile terminal, the method comprising:
performing a first operation in response to a first touch input received at a touch screen display of the mobile terminal from a first object;
performing a second operation in response to a second touch input received at the display from a second object;
distinguishing between the first touch input and the second touch input when both the first object and the second object are in contact with the display; and
performing a third operation that is different from both the first operation and the second operation based on a gesture of the first object when both the first object and the second object are in contact with the display.

16. The method of claim 15, further comprising:
displaying a control image for receiving a control command at a portion of the display in response to the second touch input that is received after receiving the first touch input.

17. The method of claim 16, further comprising:
highlighting the control image in response to the control command received from at least the first object or the second object.

18. The method of claim 16, wherein the control image comprises at least one icon corresponding to at least one application, and the performing the third operation comprises executing an application corresponding to one of the at least one icon in response to a third touch input received at the one of the at least one icon from at least the first object or the second object.

19. A control method of a mobile terminal, the method comprising:
determining whether a plurality of touch inputs are received on a touch screen display of the mobile terminal;
determining whether the received plurality of touch inputs are different types of touch inputs;
distinguishing between the plurality of touch inputs that are generated by different types of touching objects;
outputting a control image based on the distinguished plurality of touch inputs;
sensing gestures of the plurality of touch inputs; and
controlling pre-assigned operations based on the sensed gestures.

20. The method of claim 19, wherein the determining whether the plurality of touch inputs are different types of touch inputs and distinguishing between the plurality of touch inputs comprises comparing shapes and sizes of the plurality of touch inputs based on areas on the display at which the plurality of touch inputs have been received.

* * * * *